(12) United States Patent
Jin

(10) Patent No.: US 12,730,271 B2
(45) Date of Patent: Sep. 8, 2026

(54) PLATFORM SUPPORTS THE SHORTEST DIRECT ELECTRICAL CONNECTIONS BETWEEN TWO OSFP-XD TRANSCEIVERS

(71) Applicant: Shuang Jin, Dublin, CA (US)

(72) Inventor: Shuang Jin, Dublin, CA (US)

( * ) Notice: Subject to any disclaimer, the term of this patent is extended or adjusted under 35 U.S.C. 154(b) by 522 days.

(21) Appl. No.: 18/297,628

(22) Filed: Apr. 9, 2023

(65) Prior Publication Data

US 2024/0337798 A1 Oct. 10, 2024

(51) Int. Cl.
*G02B 6/42* (2006.01)
*H04B 10/40* (2013.01)

(52) U.S. Cl.
CPC ......... *G02B 6/4269* (2013.01); *G02B 6/4284* (2013.01); *H04B 10/40* (2013.01)

(58) Field of Classification Search
CPC ........ H04B 10/40; H01K 1/111; H01K 1/181; H05K 2201/09409; H05K 2201/10189; G02B 6/4269; G02B 6/4284; G02B 6/428
See application file for complete search history.

(56) References Cited

U.S. PATENT DOCUMENTS

2022/0304149 A1* 9/2022 Qiao ...................... H05K 1/117

FOREIGN PATENT DOCUMENTS

CN 112821103 A * 5/2021 ........... H01R 12/716
CN 115642419 A * 1/2023

OTHER PUBLICATIONS

English translation of CN 115642419 (Year: 2025).*
English translation of CN112821103 (Year: 2026).*

* cited by examiner

*Primary Examiner* — Tulsidas C Patel
*Assistant Examiner* — Carlos E Lopez-Pagan

(57) ABSTRACT

To establish direct electrical connections between two OSFP-XD transceivers, their connectors' footprints are specially aligned on opposite sides of a PCB board. The high-speed signal pads of the two footprints are precisely defined and connected through PCB traces and vias, according to specific configurations. The two OSFP-XD electrical connectors are then individually soldered onto their respective footprints. As a result, the electrical high-speed signals from the transceivers are directly connected via the specially defined connections in the shortest distance possible when the transceivers are plugged into their respective OSFP-XD connectors.

7 Claims, 12 Drawing Sheets

| 1 | 2 | 3 | 4 | 5 | 6 | 7 | 8 | 9 | 10 | 11 | 12 | 13 |
|---|---|---|---|---|---|---|---|---|---|---|---|---|
| GND | TX10p | TX10n | GND | TX12p | TX12n | GND | TX14p | TX14n | GND | TX16p | TX16n | GND |
| 18 | 19 | 20 | 21 | 22 | 23 | 24 | 25 | 26 | 27 | 28 | 29 | 30 |
| GND | RX15n | RX15p | GND | RX13n | RX13p | GND | RX11n | RX11p | GND | RX9n | RX9p | GND |
| 31 | 32 | 33 | 34 | 35 | 36 | 37 | 38 | 39 | 40 | 41 | 42 | 43 |
| GND | RX10p | RX10n | GND | RX12p | RX12n | GND | RX14p | RX14n | GND | RX16p | RX16n | GND |
| 48 | 49 | 50 | 51 | 52 | 53 | 54 | 55 | 56 | 57 | 58 | 59 | 60 |
| GND | TX15n | TX15p | GND | TX13n | TX13p | GND | TX11n | TX11p | GND | TX9n | TX9p | GND |
| 61 | 62 | 63 | 64 | 65 | 66 | 67 | 68 | 69 | 70 | 71 | 72 | 73 |
| GND | TX2p | TX2n | GND | TX4p | TX4n | GND | TX6p | TX6n | GND | TX8p | TX8n | GND |
| 78 | 79 | 80 | 81 | 82 | 83 | 84 | 85 | 86 | 87 | 88 | 89 | 90 |
| GND | RX7n | RX7p | GND | RX5n | RX5p | GND | RX3n | RX3p | GND | RX1n | RX1p | GND |
| 91 | 92 | 93 | 94 | 95 | 96 | 97 | 98 | 99 | 100 | 101 | 102 | 103 |
| GND | RX2p | RX2n | GND | RX4p | RX4n | GND | RX6p | RX6n | GND | RX8p | RX8n | GND |
| 108 | 109 | 110 | 111 | 112 | 113 | 114 | 115 | 116 | 117 | 118 | 119 | 120 |
| GND | TX7n | TX7p | GND | TX5n | TX5p | GND | TX3n | TX3p | GND | TX1n | TX1p | GND |

FIG. 11

| 30 | 29 | 28 | 27 | 26 | 25 | 24 | 23 | 22 | 21 | 20 | 19 | 18 |
|---|---|---|---|---|---|---|---|---|---|---|---|---|
| GND | RX9p | RX9n | GND | RX11p | RX11n | GND | RX13p | RX13n | GND | RX15p | RX15n | GND |

| 13 | 12 | 11 | 10 | 9 | 8 | 7 | 6 | 5 | 4 | 3 | 2 | 1 |
|---|---|---|---|---|---|---|---|---|---|---|---|---|
| GND | TX16n | TX16p | GND | TX14n | TX14p | GND | TX12n | TX12p | GND | TX10n | TX10p | GND |

| 60 | 59 | 58 | 57 | 56 | 55 | 54 | 53 | 52 | 51 | 50 | 49 | 48 |
|---|---|---|---|---|---|---|---|---|---|---|---|---|
| GND | TX9p | TX9n | GND | TX11p | TX11n | GND | TX13p | TX13n | GND | TX15p | TX15n | GND |

| 43 | 42 | 41 | 40 | 39 | 38 | 37 | 36 | 35 | 34 | 33 | 32 | 31 |
|---|---|---|---|---|---|---|---|---|---|---|---|---|
| GND | RX16n | RX16p | GND | RX14n | RX14p | GND | RX12n | RX12p | GND | RX10n | RX10p | GND |

| 90 | 89 | 88 | 87 | 86 | 85 | 84 | 83 | 82 | 81 | 80 | 79 | 78 |
|---|---|---|---|---|---|---|---|---|---|---|---|---|
| GND | RX1p | RX1n | GND | RX3p | RX3n | GND | RX5p | RX5n | GND | RX7p | RX7n | GND |

| 73 | 72 | 71 | 70 | 69 | 68 | 67 | 66 | 65 | 64 | 63 | 62 | 61 |
|---|---|---|---|---|---|---|---|---|---|---|---|---|
| GND | TX8n | TX8p | GND | TX6n | TX6p | GND | TX4n | TX4p | GND | TX2n | TX2p | GND |

| 120 | 119 | 118 | 117 | 116 | 115 | 114 | 113 | 112 | 111 | 110 | 109 | 108 |
|---|---|---|---|---|---|---|---|---|---|---|---|---|
| GND | TX1p | TX1n | GND | TX3p | TX3n | GND | TX5p | TX5n | GND | TX7p | TX7n | GND |

| 103 | 102 | 101 | 100 | 99 | 98 | 97 | 96 | 95 | 94 | 93 | 92 | 91 |
|---|---|---|---|---|---|---|---|---|---|---|---|---|
| GND | RX8n | RX8p | GND | RX6n | RX6p | GND | RX4n | RX4p | GND | RX2n | RX2p | GND |

FIG. 12

| Pad1 | Pad2 | Pad3 | Pad4 | Pad5 | Pad6 | Pad7 | Pad8 | Pad9 | Pad10 | Pad11 | Pad12 | Pad13 |
|---|---|---|---|---|---|---|---|---|---|---|---|---|
| GND | TX10p | TX10n | GND | TX12p | TX12n | GND | TX14p | TX14n | GND | TX16p | TX16n | GND |
| Pad30 | Pad29 | Pad28 | Pad27 | Pad26 | Pad25 | Pad24 | Pad23 | Pad22 | Pad21 | Pad20 | Pad19 | Pad18 |
| GND | RX9p | RX9n | GND | RX11p | RX11n | GND | RX13p | RX13n | GND | RX15p | RX15n | GND |

| Pad18 | Pad19 | Pad20 | Pad21 | Pad22 | Pad23 | Pad24 | Pad25 | Pad26 | Pad27 | Pad28 | Pad29 | Pad30 |
|---|---|---|---|---|---|---|---|---|---|---|---|---|
| GND | RX15n | RX15p | GND | RX13n | RX13p | GND | RX11n | RX11p | GND | RX9n | RX9p | GND |
| Pad13 | Pad12 | Pad11 | Pad10 | Pad9 | Pad8 | Pad7 | Pad6 | Pad5 | Pad4 | Pad3 | Pad2 | Pad1 |
| GND | TX16n | TX16p | GND | TX14n | TX14p | GND | TX12n | TX12p | GND | TX10n | TX10p | GND |

| Pad31 | Pad32 | Pad33 | Pad34 | Pad35 | Pad36 | Pad37 | Pad38 | Pad39 | Pad40 | Pad41 | Pad42 | Pad43 |
|---|---|---|---|---|---|---|---|---|---|---|---|---|
| GND | RX10p | RX10n | GND | RX12p | RX12n | GND | RX14p | RX14n | GND | RX16p | RX16n | GND |
| Pad60 | Pad59 | Pad58 | Pad57 | Pad56 | Pad55 | Pad54 | Pad53 | Pad52 | Pad51 | Pad50 | Pad49 | Pad48 |
| GND | TX9p | TX9n | GND | TX11p | TX11n | GND | TX13p | TX13n | GND | TX15p | TX15n | GND |

| Pad48 | Pad49 | Pad50 | Pad51 | Pad52 | Pad53 | Pad54 | Pad55 | Pad56 | Pad57 | Pad58 | Pad59 | Pad60 |
|---|---|---|---|---|---|---|---|---|---|---|---|---|
| GND | TX15n | TX15p | GND | TX13n | TX13p | GND | TX11n | TX11p | GND | TX9n | TX9p | GND |
| Pad43 | Pad42 | Pad41 | Pad40 | Pad39 | Pad38 | Pad37 | Pad36 | Pad35 | Pad34 | Pad33 | Pad32 | Pad31 |
| GND | RX16n | RX16p | GND | RX14n | RX14p | GND | RX12n | RX12p | GND | RX10n | RX10p | GND |

| Pad61 | Pad62 | Pad63 | Pad64 | Pad65 | Pad66 | Pad67 | Pad68 | Pad69 | Pad70 | Pad71 | Pad72 | Pad73 |
|---|---|---|---|---|---|---|---|---|---|---|---|---|
| GND | TX2p | TX2n | GND | TX4p | TX4n | GND | TX6p | TX6n | GND | TX8p | TX8n | GND |
| Pad90 | Pad89 | Pad88 | Pad87 | Pad86 | Pad85 | Pad84 | Pad83 | Pad82 | Pad81 | Pad80 | Pad79 | Pad78 |
| GND | RX1p | RX1n | GND | RX3p | RX3n | GND | RX5p | RX5n | GND | RX7p | RX7n | GND |

| Pad78 | Pad79 | Pad80 | Pad81 | Pad82 | Pad83 | Pad84 | Pad85 | Pad86 | Pad87 | Pad88 | Pad89 | Pad90 |
|---|---|---|---|---|---|---|---|---|---|---|---|---|
| GND | RX7n | RX7p | GND | RX5n | RX5p | GND | RX3n | RX3p | GND | RX1n | RX1p | GND |
| Pad73 | Pad72 | Pad71 | Pad70 | Pad69 | Pad68 | Pad67 | Pad66 | Pad65 | Pad64 | Pad63 | Pad62 | Pad61 |
| GND | TX8n | TX8p | GND | TX6n | TX6p | GND | TX4n | TX4p | GND | TX2n | TX2p | GND |

| Pad91 | Pad92 | Pad93 | Pad94 | Pad95 | Pad96 | Pad97 | Pad98 | Pad99 | Pad100 | Pad101 | Pad102 | Pad103 |
|---|---|---|---|---|---|---|---|---|---|---|---|---|
| GND | RX2p | RX2n | GND | RX4p | RX4n | GND | RX6p | RX6n | GND | RX8p | RX8n | GND |
| Pad120 | Pad119 | Pad118 | Pad117 | Pad116 | Pad115 | Pad114 | Pad113 | Pad112 | Pad111 | Pad110 | Pad109 | Pad108 |
| GND | TX1p | TX1n | GND | TX3p | TX3n | GND | TX5p | TX5n | GND | TX7p | TX7n | GND |

| Pad108 | Pad109 | Pad110 | Pad111 | Pad112 | Pad113 | Pad114 | Pad115 | Pad116 | Pad117 | Pad118 | Pad119 | Pad120 |
|---|---|---|---|---|---|---|---|---|---|---|---|---|
| GND | TX7n | TX7p | GND | TX5n | TX5p | GND | TX3n | TX3p | GND | TX1n | TX1p | GND |
| Pad103 | Pad102 | Pad101 | Pad100 | Pad99 | Pad98 | Pad97 | Pad96 | Pad95 | Pad94 | Pad93 | Pad92 | Pad91 |
| GND | RX8n | RX8p | GND | RX6n | RX6p | GND | RX4n | RX4p | GND | RX2n | RX2p | GND |

FIG. 13

| Pad1 | Pad2 | Pad3 | Pad4 | Pad5 | Pad6 | Pad7 | Pad8 | Pad9 | Pad10 | Pad11 | Pad12 | Pad13 |
|---|---|---|---|---|---|---|---|---|---|---|---|---|
| GND | TX10p | TX10n | GND | TX12p | TX12n | GND | TX14p | TX14n | GND | TX16p | TX16n | GND |
| Pad30 | Pad28 | Pad29 | Pad27 | Pad25 | Pad26 | Pad24 | Pad22 | Pad23 | Pad21 | Pad19 | Pad20 | Pad18 |
| GND | RX9n | RX9p | GND | RX11n | RX11p | GND | RX13n | RX13p | GND | RX15n | RX15p | GND |

| Pad18 | Pad19 | Pad20 | Pad21 | Pad22 | Pad23 | Pad24 | Pad25 | Pad26 | Pad27 | Pad28 | Pad29 | Pad30 |
|---|---|---|---|---|---|---|---|---|---|---|---|---|
| GND | RX15n | RX15p | GND | RX13n | RX13p | GND | RX11n | RX11p | GND | RX9n | RX9p | GND |
| Pad13 | Pad11 | Pad12 | Pad10 | Pad8 | Pad9 | Pad7 | Pad5 | Pad6 | Pad4 | Pad2 | Pad3 | Pad1 |
| GND | TX16p | TX16n | GND | TX14p | TX14n | GND | TX12p | TX12n | GND | TX10p | TX10n | GND |

| Pad31 | Pad32 | Pad33 | Pad34 | Pad35 | Pad36 | Pad37 | Pad38 | Pad39 | Pad40 | Pad41 | Pad42 | Pad43 |
|---|---|---|---|---|---|---|---|---|---|---|---|---|
| GND | RX10p | RX10n | GND | RX12p | RX12n | GND | RX14p | RX14n | GND | RX16p | RX16n | GND |
| Pad60 | Pad58 | Pad59 | Pad57 | Pad55 | Pad56 | Pad54 | Pad52 | Pad53 | Pad51 | Pad49 | Pad50 | Pad48 |
| GND | TX9n | TX9p | GND | TX11n | TX11p | GND | TX13n | TX13p | GND | TX15n | TX15p | GND |

| Pad48 | Pad49 | Pad50 | Pad51 | Pad52 | Pad53 | Pad54 | Pad55 | Pad56 | Pad57 | Pad58 | Pad59 | Pad60 |
|---|---|---|---|---|---|---|---|---|---|---|---|---|
| GND | TX15n | TX15p | GND | TX13n | TX13p | GND | TX11n | TX11p | GND | TX9n | TX9p | GND |
| Pad43 | Pad41 | Pad42 | Pad40 | Pad38 | Pad39 | Pad37 | Pad35 | Pad36 | Pad34 | Pad32 | Pad33 | Pad31 |
| GND | RX16p | RX16n | GND | RX14p | RX14n | GND | RX12p | RX12n | GND | RX10p | RX10n | GND |

| Pad61 | Pad62 | Pad63 | Pad64 | Pad65 | Pad66 | Pad67 | Pad68 | Pad69 | Pad70 | Pad71 | Pad72 | Pad73 |
|---|---|---|---|---|---|---|---|---|---|---|---|---|
| GND | TX2p | TX2n | GND | TX4p | TX4n | GND | TX6p | TX6n | GND | TX8p | TX8n | GND |
| Pad90 | Pad88 | Pad89 | Pad87 | Pad85 | Pad86 | Pad84 | Pad82 | Pad83 | Pad81 | Pad79 | Pad80 | Pad78 |
| GND | RX1n | RX1p | GND | RX3n | RX3p | GND | RX5n | RX5p | GND | RX7n | RX7p | GND |

| Pad78 | Pad79 | Pad80 | Pad81 | Pad82 | Pad83 | Pad84 | Pad85 | Pad86 | Pad87 | Pad88 | Pad89 | Pad90 |
|---|---|---|---|---|---|---|---|---|---|---|---|---|
| GND | RX7n | RX7p | GND | RX5n | RX5p | GND | RX3n | RX3p | GND | RX1n | RX1p | GND |
| Pad73 | Pad71 | Pad72 | Pad70 | Pad68 | Pad69 | Pad67 | Pad65 | Pad66 | Pad64 | Pad62 | Pad63 | Pad61 |
| GND | TX8p | TX8n | GND | TX6p | TX6n | GND | TX4p | TX4n | GND | TX2p | TX2n | GND |

| Pad91 | Pad92 | Pad93 | Pad94 | Pad95 | Pad96 | Pad97 | Pad98 | Pad99 | Pad100 | Pad101 | Pad102 | Pad103 |
|---|---|---|---|---|---|---|---|---|---|---|---|---|
| GND | RX2p | RX2n | GND | RX4p | RX4n | GND | RX6p | RX6n | GND | RX8p | RX8n | GND |
| Pad120 | Pad118 | Pad119 | Pad117 | Pad115 | Pad116 | Pad114 | Pad112 | Pad113 | Pad111 | Pad109 | Pad110 | Pad108 |
| GND | TX1n | TX1p | GND | TX3n | TX3p | GND | TX5n | TX5p | GND | TX7n | TX7p | GND |

| Pad108 | Pad109 | Pad110 | Pad111 | Pad112 | Pad113 | Pad114 | Pad115 | Pad116 | Pad117 | Pad118 | Pad119 | Pad120 |
|---|---|---|---|---|---|---|---|---|---|---|---|---|
| GND | TX7n | TX7p | GND | TX5n | TX5p | GND | TX3n | TX3p | GND | TX1n | TX1p | GND |
| Pad103 | Pad101 | Pad102 | Pad100 | Pad98 | Pad99 | Pad97 | Pad95 | Pad96 | Pad94 | Pad92 | Pad93 | Pad91 |
| GND | RX8p | RX8n | GND | RX6p | RX6n | GND | RX4p | RX4n | GND | RX2p | RX2n | GND |

FIG. 14

PLATFORM SUPPORTS THE SHORTEST DIRECT ELECTRICAL CONNECTIONS BETWEEN TWO OSFP-XD TRANSCEIVERS

FIELD OF APPLICATION OF THIS INVENTION

Data Center, Networking Equipment and Connectivity industries' R&D, Testing and Production.

BACKGROUND

Octal Small Form Factor, Extra Density (OSFP-XD) transceivers are set to become widely used in the Data Center, Networking Equipment, and Connectivity industries due to their high channel density, high signal rate and high thermal handling capacity, surpassing that of existing form factor optical transceivers. With 16 channels of electrical TX and 16 channels of electrical RX, each channel supporting 112 Gbps, 224 Gbps, and beyond, the development of such transceivers poses challenges in creating proper test setups to fan out all high-speed electrical signals to test equipment terminals. Traditional methods such as using test boards, edge mount or vertical mount RF connectors, and RF coaxial cables have proven inadequate due to space constraints, the sheer number of cables approaching the DUT connector, and the detrimental effects of long cables and PCB traces on signal integrity. A solution that eliminates the need for RF coaxial cables, RF cable connectors, and long high-speed signal traces on the test board is in high demand. Fortunately, a novel idea featuring an interposer board supporting direct electrical connections between two transceivers can address these constraints and issues. This invention establishes a fundamental platform that overcomes the bottlenecks mentioned above by using the interposer board. Extraordinarily, the interposer board can provide adjustable length to the shortest and all uniform length electrical connections for all electrical high-speed signals coming from two OSFP-XD transceivers. This invention presents the fundamental interposer platform and demonstrates how it can be implemented to support efficient testing of OSFP-XD transceivers.

SUMMARY OF THE INVENTION

To achieve optimal performance in connecting the high-speed signals from two OSFP-XD transceivers, the two transceivers should be plugged into two OSFP-XD electrical connectors mounted on opposite sides of a PCB interposer board. The two electrical connectors are soldered or epoxied onto their footprints, each consisting of 120 pads, of which 64 are defined as high-speed signals. The footprints are aligned so that all adjacent pads are evenly spaced and aligned when perpendicularly viewed through the transparent view of the PCB interposer board. Length adjustable PCB traces and vias connect each pair of specially mated pads, which are located on opposite sides of the PCB interposer board. As a result, the electrical high-speed signals coming from the two transceivers are directly connected through the electrical connectors, footprints' pads, and length-adjustable PCB traces and vias.

This invention is a PCB interposer platform that enables the direct, uniform, and shortest electrical connections for all high-speed signals from two OSFP-XD transceivers. This approach distinguishes itself from others by allowing for adjustable length to the shortest capability, uniform connections, minimum space requirements, and importantly, eliminating the need for RF cables and their connectors.

DESCRIPTION OF THE EMBODIMENT

1. An OSFP-XD electrical connector's PCB footprint Footprint A on the top side of a PCB board is shown in FIG.

1 (Top View). There are 120 soldering pads in the footprint. Each pad is assigned a unique number to stand for the physical location of the pad in the footprint.

2. The OSFP-XD electrical connector's PCB footprint Footprint A's some soldering pads are defined as high-speed signals and GND signals, and the pads' pin assignments are shown in Table 1. The numbers in the Table 1 are corresponding to Footprint A's pads' numbers and stand for the physical locations of the soldering pads in Footprint A shown in FIG. 1.

Figure 2:
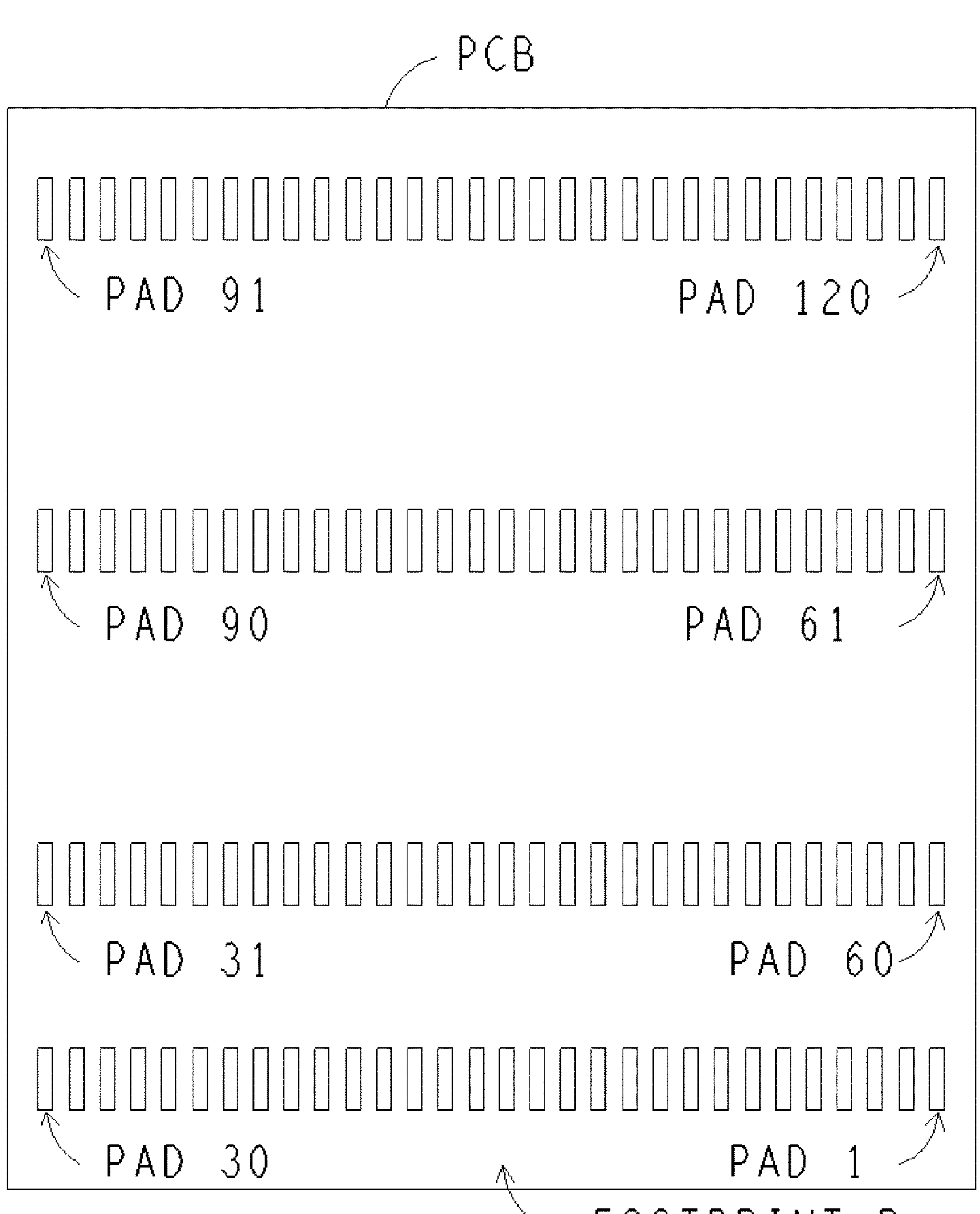
FIG. 2 is a drawing of an OSFP-XD electrical connector's footprint Footprint B on the bottom side of a PCB (Top transparent view).
3.

3. An OSFP-XD electrical connector's PCB footprint Footprint B on the bottom side of a PCB board is shown in FIG. 2 (Top Transparent View). There are 120 soldering pads in the footprint. Each pad is assigned a unique number to stand for the physical location of the pad in the footprint.

4. The OSFP-XD electrical connector's PCB footprint Footprint B's some soldering pads are defined as high-speed signals and GND signals, and the pads' pin assignments are shown in Table 2. The numbers in the Table 2 are corresponding to the Footprint B's pads' numbers and stand for the physical locations of the soldering pads in Footprint B shown in FIG. 2.

Figure 3:
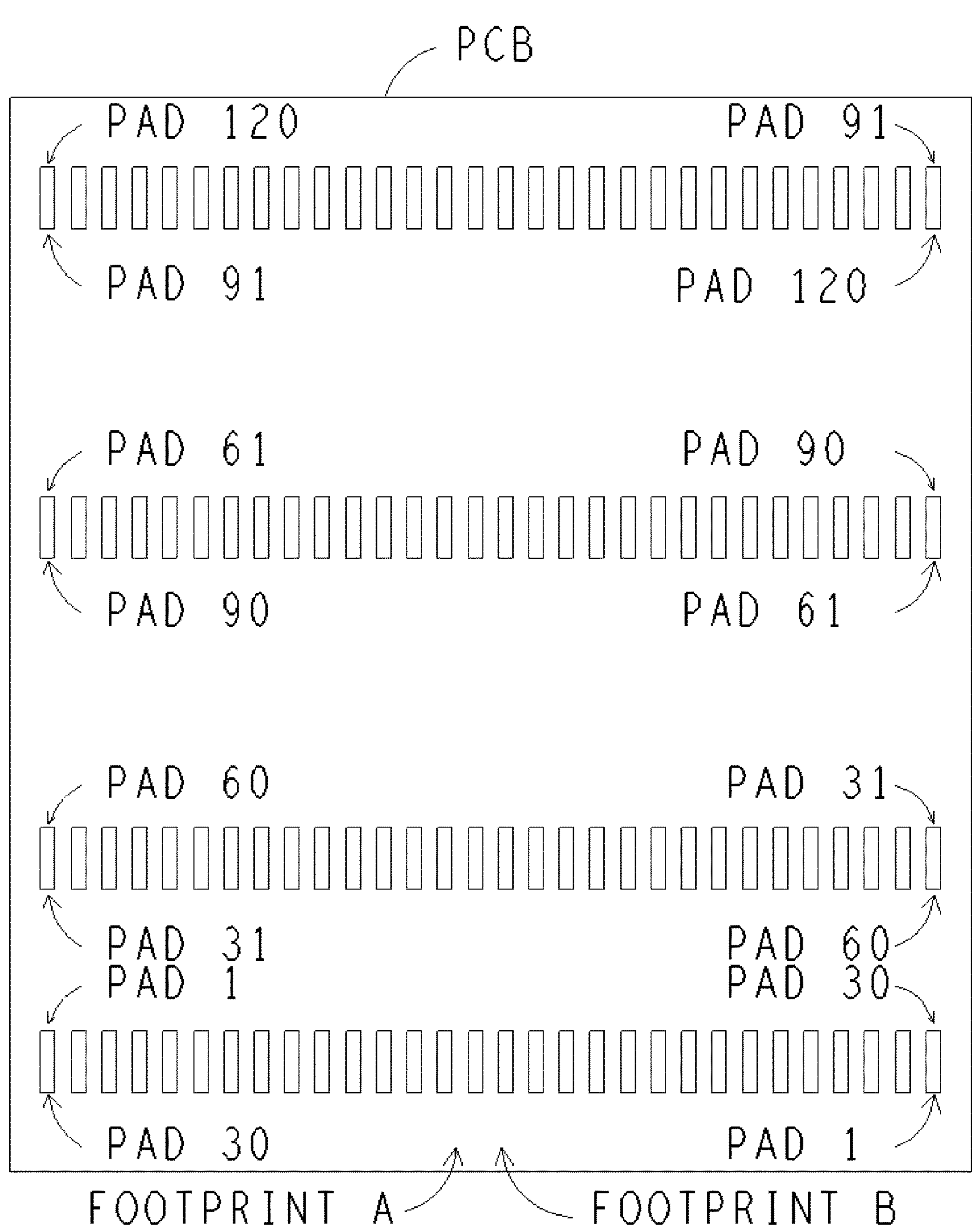
FIG. 3 is a drawing of two OSFP-XD electrical connectors' footprints Footprint A and Footprint B disposed on the different sides of a PCB and aligned in a special way as shown (Top transparent view).
4.

5. As shown in FIG. 3, OSFP-XD electrical connector Connector A's footprint Footprint A is placed on the top side of a PCB board, and OSFP-XD electrical connector Connector B's footprint Footprint B is placed on the bottom side of the same PCB board. Perpendicularly looking through transparent view from top side of the PCB board, the two footprints are aligned as the way that all adjacent pads are lined up and spaced evenly. The pads below the numbers are from Footprint A on the top side of the PCB board, and the pads above the numbers are from Footprint B on the bottom side of the PCB board. The numbers above the pads are the corresponding pad-numbers shown in FIG. 1 and Table 1; and the numbers below the pads are the corresponding pad-numbers shown in FIG. 2 and Table 2.

Figure 1:
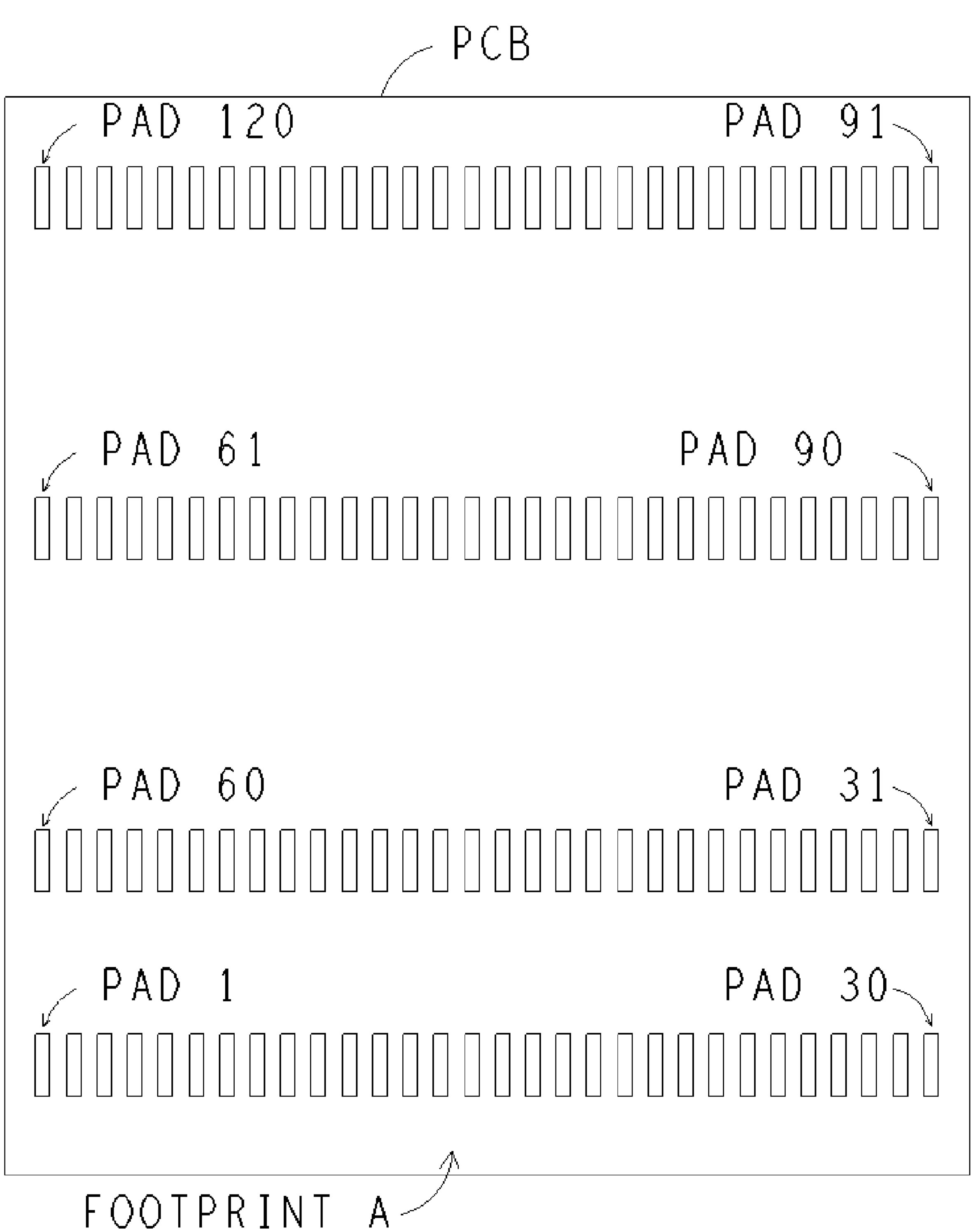
FIG. 1 is a drawing of an OSFP-XD electrical connector's footprint Footprint A on the top side of a PCB (Top view).
2.

6. As shown in FIG. 1 and Table 1, Footprint A has high-speed signals and GND signals, and as shown in FIG. 2 and Table 2, Footprint B also has high-speed signals and GND signals; and the connections between the high-speed signals from Footprint A and Footprint B are defined as the Type I shown in Table 3. In Table 3, the numbers in the shades of backslash lines are from Footprint A and the numbers in the shades of forward slash lines are from the Footprint B, and the numbers in the shades of horizontal lines are from Footprint A and the numbers in the shades of vertical lines are from Footprint B.

The connection mappings are as the followings:

Footprint A's pad 2 is connected to Footprint B's pad 29,
Footprint A's pad 3 is connected to Footprint B's pad 28,
Footprint A's pad 5 is connected to Footprint B's pad 26,
Footprint A's pad 6 is connected to Footprint B's pad 25,
Footprint A's pad 8 is connected to Footprint B's pad 23,
Footprint A's pad 9 is connected to Footprint B's pad 22,
Footprint A's pad 11 is connected to Footprint B's pad 20,
Footprint A's pad 12 is connected to Footprint B's pad 19,
Footprint A's pad 19 is connected to Footprint B's pad 12,
Footprint A's pad 20 is connected to Footprint B's pad 11,
Footprint A's pad 22 is connected to Footprint B's pad 9,
Footprint A's pad 23 is connected to Footprint B's pad 8,
Footprint A's pad 25 is connected to Footprint B's pad 6,
Footprint A's pad 26 is connected to Footprint B's pad 5,
Footprint A's pad 28 is connected to Footprint B's pad 3,
Footprint A's pad 29 is connected to Footprint B's pad 2,
Footprint A's pad 32 is connected to Footprint B's pad 59,
Footprint A's pad 33 is connected to Footprint B's pad 58,
Footprint A's pad 35 is connected to Footprint B's pad 56,
Footprint A's pad 36 is connected to Footprint B's pad 55,
Footprint A's pad 38 is connected to Footprint B's pad 53,
Footprint A's pad 39 is connected to Footprint B's pad 52,
Footprint A's pad 41 is connected to Footprint B's pad 50,
Footprint A's pad 42 is connected to Footprint B's pad 49,
Footprint A's pad 49 is connected to Footprint B's pad 42,
Footprint A's pad 50 is connected to Footprint B's pad 41,
Footprint A's pad 52 is connected to Footprint B's pad 39,
Footprint A's pad 53 is connected to Footprint B's pad 38,
Footprint A's pad 55 is connected to Footprint B's pad 36,
Footprint A's pad 56 is connected to Footprint B's pad 35,
Footprint A's pad 58 is connected to Footprint B's pad 33,
Footprint A's pad 59 is connected to Footprint B's pad 32,
Footprint A's pad 62 is connected to Footprint B's pad 89,
Footprint A's pad 63 is connected to Footprint B's pad 88,
Footprint A's pad 65 is connected to Footprint B's pad 86,
Footprint A's pad 66 is connected to Footprint B's pad 85,
Footprint A's pad 68 is connected to Footprint B's pad 83,
Footprint A's pad 69 is connected to Footprint B's pad 82,
Footprint A's pad 71 is connected to Footprint B's pad 80,
Footprint A's pad 72 is connected to Footprint B's pad 79,
Footprint A's pad 79 is connected to Footprint B's pad 72,
Footprint A's pad 80 is connected to Footprint B's pad 71,
Footprint A's pad 82 is connected to Footprint B's pad 69,
Footprint A's pad 83 is connected to Footprint B's pad 68,
Footprint A's pad 85 is connected to Footprint B's pad 66,
Footprint A's pad 86 is connected to Footprint B's pad 65,
Footprint A's pad 88 is connected to Footprint B's pad 63,
Footprint A's pad 89 is connected to Footprint B's pad 62,
Footprint A's pad 92 is connected to Footprint B's pad 119,
Footprint A's pad 93 is connected to Footprint B's pad 118,
Footprint A's pad 95 is connected to Footprint B's pad 116,
Footprint A's pad 96 is connected to Footprint B's pad 115,
Footprint A's pad 98 is connected to Footprint B's pad 113,
Footprint A's pad 99 is connected to Footprint B's pad 112,
Footprint A's pad 101 is connected to Footprint B's pad 110,
Footprint A's pad 102 is connected to Footprint B's pad 109,
Footprint A's pad 109 is connected to Footprint B's pad 102,
Footprint A's pad 110 is connected to Footprint B's pad 101,
Footprint A's pad 112 is connected to Footprint B's pad 99,
Footprint A's pad 113 is connected to Footprint B's pad 98,
Footprint A's pad 115 is connected to Footprint B's pad 96,
Footprint A's pad 116 is connected to Footprint B's pad 95,
Footprint A's pad 118 is connected to Footprint B's pad 93,
Footprint A's pad 119 is connected to Footprint B's pad 92.

7. As shown in FIG. 1 and Table 1, Footprint A has high-speed signals and GND signals, and as shown in FIG. 2 and Table 2, Footprint B also has high-speed signals and GND signals; and the connections between the high-speed signals from Footprint A and Footprint B are defined as the Type II shown in Table 4. In Table 4, the numbers in the shades of backslash lines are from Footprint A and the numbers in the shades of forward slash lines are from the Footprint B, and the numbers in the shades of horizontal lines are from Footprint A and the numbers in the shades of vertical lines are from Footprint B.

The connection mappings are as the followings:

Footprint A's pad 2 is connected to Footprint B's pad 28,
Footprint A's pad 3 is connected to Footprint B's pad 29,
Footprint A's pad 5 is connected to Footprint B's pad 25,
Footprint A's pad 6 is connected to Footprint B's pad 26,
Footprint A's pad 8 is connected to Footprint B's pad 22,
Footprint A's pad 9 is connected to Footprint B's pad 23,
Footprint A's pad 11 is connected to Footprint B's pad 19,
Footprint A's pad 12 is connected to Footprint B's pad 20,
Footprint A's pad 19 is connected to Footprint B's pad 11,
Footprint A's pad 20 is connected to Footprint B's pad 12,
Footprint A's pad 22 is connected to Footprint B's pad 8,
Footprint A's pad 23 is connected to Footprint B's pad 9,
Footprint A's pad 25 is connected to Footprint B's pad 5,
Footprint A's pad 26 is connected to Footprint B's pad 6,
Footprint A's pad 28 is connected to Footprint B's pad 2,
Footprint A's pad 29 is connected to Footprint B's pad 3,
Footprint A's pad 32 is connected to Footprint B's pad 58,
Footprint A's pad 33 is connected to Footprint B's pad 59,
Footprint A's pad 35 is connected to Footprint B's pad 55,
Footprint A's pad 36 is connected to Footprint B's pad 56,
Footprint A's pad 38 is connected to Footprint B's pad 52,
Footprint A's pad 39 is connected to Footprint B's pad 53,
Footprint A's pad 41 is connected to Footprint B's pad 49,
Footprint A's pad 42 is connected to Footprint B's pad 50,
Footprint A's pad 49 is connected to Footprint B's pad 41,
Footprint A's pad 50 is connected to Footprint B's pad 42,
Footprint A's pad 52 is connected to Footprint B's pad 38,
Footprint A's pad 53 is connected to Footprint B's pad 39,
Footprint A's pad 55 is connected to Footprint B's pad 35,
Footprint A's pad 56 is connected to Footprint B's pad 36,
Footprint A's pad 58 is connected to Footprint B's pad 32,
Footprint A's pad 59 is connected to Footprint B's pad 33,
Footprint A's pad 62 is connected to Footprint B's pad 88,
Footprint A's pad 63 is connected to Footprint B's pad 89,
Footprint A's pad 65 is connected to Footprint B's pad 85,
Footprint A's pad 66 is connected to Footprint B's pad 86,
Footprint A's pad 68 is connected to Footprint B's pad 82,
Footprint A's pad 69 is connected to Footprint B's pad 83,
Footprint A's pad 71 is connected to Footprint B's pad 79,
Footprint A's pad 72 is connected to Footprint B's pad 80,
Footprint A's pad 79 is connected to Footprint B's pad 71,
Footprint A's pad 80 is connected to Footprint B's pad 72,
Footprint A's pad 82 is connected to Footprint B's pad 68,
Footprint A's pad 83 is connected to Footprint B's pad 69,
Footprint A's pad 85 is connected to Footprint B's pad 65,
Footprint A's pad 86 is connected to Footprint B's pad 66,
Footprint A's pad 88 is connected to Footprint B's pad 62,
Footprint A's pad 89 is connected to Footprint B's pad 63,
Footprint A's pad 92 is connected to Footprint B's pad 118,
Footprint A's pad 93 is connected to Footprint B's pad 119,
Footprint A's pad 95 is connected to Footprint B's pad 115,
Footprint A's pad 96 is connected to Footprint B's pad 116,
Footprint A's pad 98 is connected to Footprint B's pad 112,
Footprint A's pad 99 is connected to Footprint B's pad 113,
Footprint A's pad 101 is connected to Footprint B's pad 109,
Footprint A's pad 102 is connected to Footprint B's pad 110,
Footprint A's pad 109 is connected to Footprint B's pad 101,
Footprint A's pad 110 is connected to Footprint B's pad 102,
Footprint A's pad 112 is connected to Footprint B's pad 98,
Footprint A's pad 113 is connected to Footprint B's pad 99,
Footprint A's pad 115 is connected to Footprint B's pad 95,
Footprint A's pad 116 is connected to Footprint B's pad 96,
Footprint A's pad 118 is connected to Footprint B's pad 92,
Footprint A's pad 119 is connected to Footprint B's pad 93.

Figure 4:
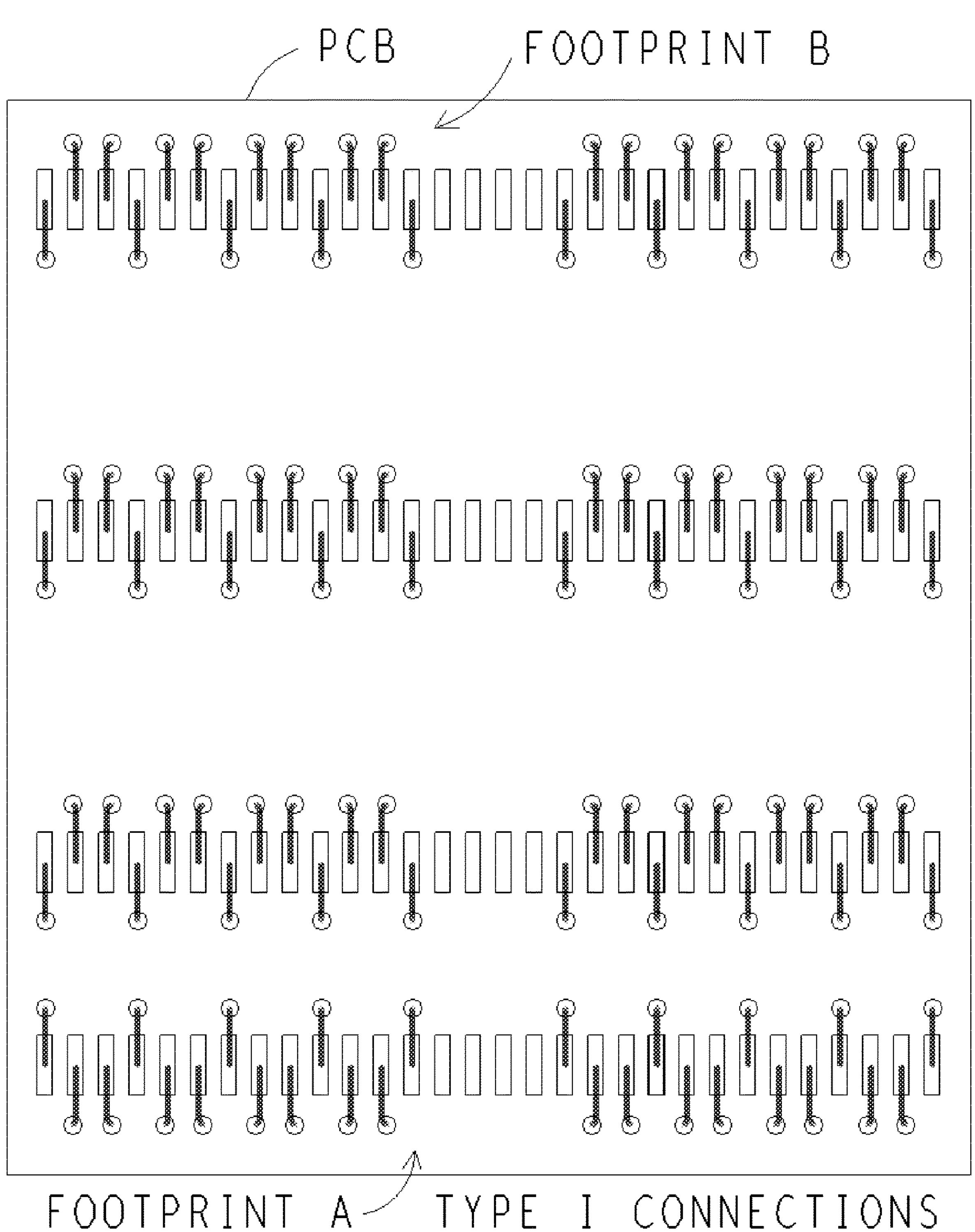
FIG. 4 is a drawing of how the high-speed signals' pads of the two OSFP-XD electrical connectors' footprints Footprint A and Footprint B are connected through PCB traces and vias on a PCB board when the connections of the pads are defined in Type I (Top transparent view).
5.

8. As shown in FIG. 4, for Type I connections, each pair of mated pads defined in Table 3 are connected through length adjustable PCB traces and at least one through hole via. The pads on the top side of a PCB board and the pads on the bottom side of the PCB board are 100% overlapped in terms of top transparent view. The length adjustable PCB traces on the top side and the length adjustable PCB traces on the bottom side are uniformly symmetrical and also 100% overlapped in terms of top transparent view. Each through hole via is connected to the PCB traces on the top of the PCB and the PCB traces on the bottom of the PCB.

Figure 5:
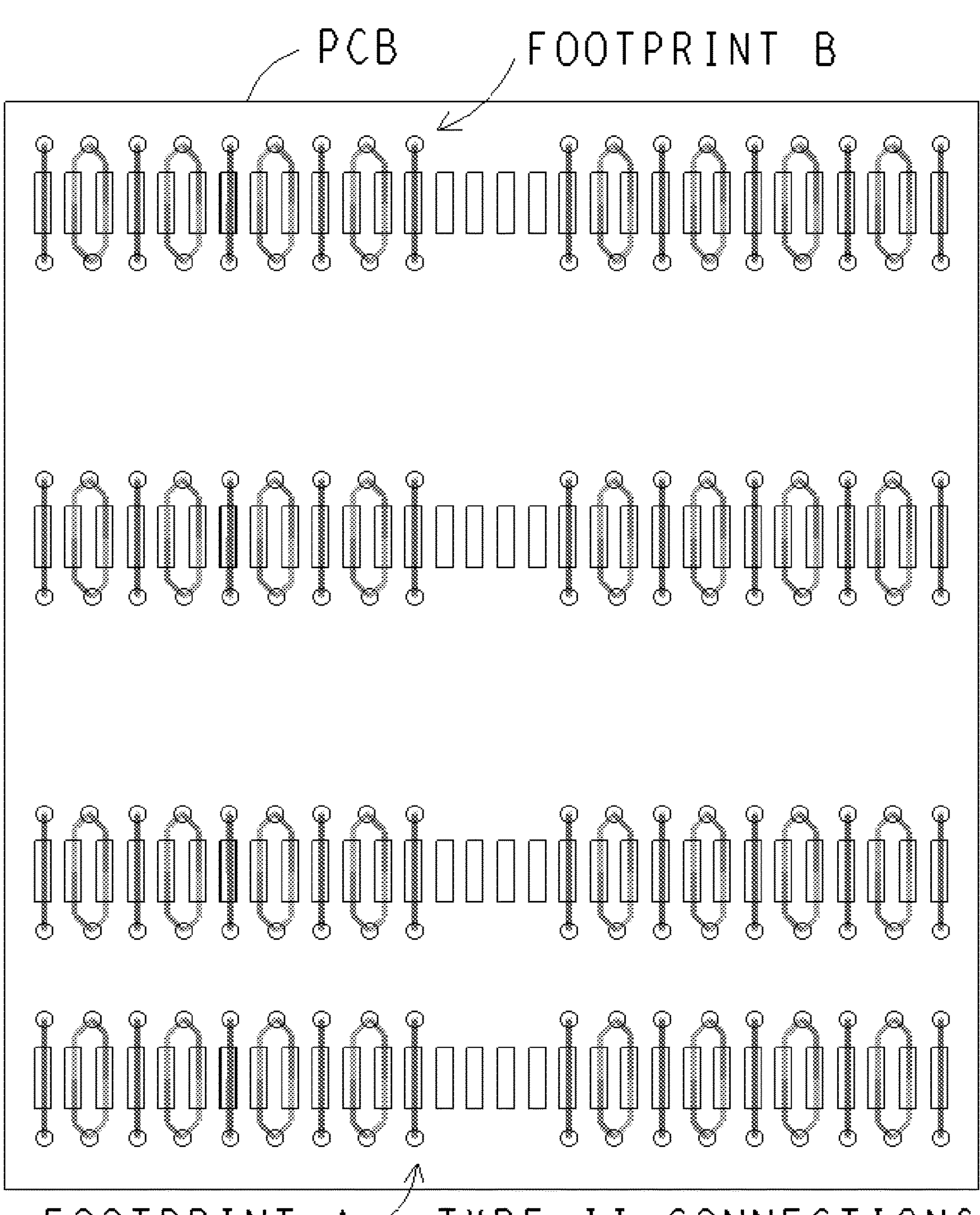
FIG. 5 is a drawing of how the high-speed signals' pads of the two OSFP-XD electrical connectors' footprints Footprint A and Footprint B are connected through PCB traces and vias on a PCB board when the connections of the pads are defined in Type II (Top transparent view).
6.

9. As shown in FIG. 5, for Type II connections, each pair of mated pads defined in Table 4 are connected through length adjustable PCB traces and at least one through hole via. The pads on the top side of a PCB board and the pads on the bottom side of the PCB board are 100% overlapped in terms of top transparent view. The length adjustable PCB traces on the top side and the length adjustable PCB traces on the bottom side are uniformly symmetrical in terms of top transparent view. Each through hole via is connected to the PCB traces on the top of the PCB and the PCB traces on the bottom of the PCB.

Figure 6:
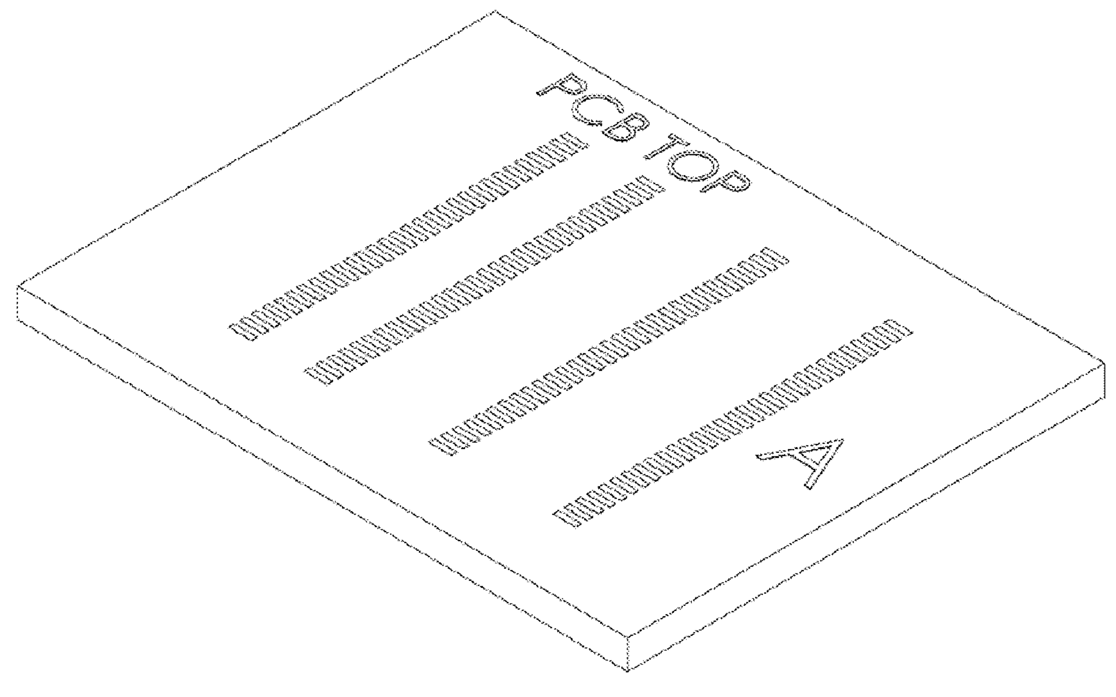
FIG. 6 is a 3D drawing of an OSFP-XD electrical connector's footprint Footprint A disposed on the top side of a PCB board.
7.

10. OSFP-XD electrical connector Connector A's footprint Footprint A is placed on the top of a PCB board as shown in FIG. 6.

Figure 7:
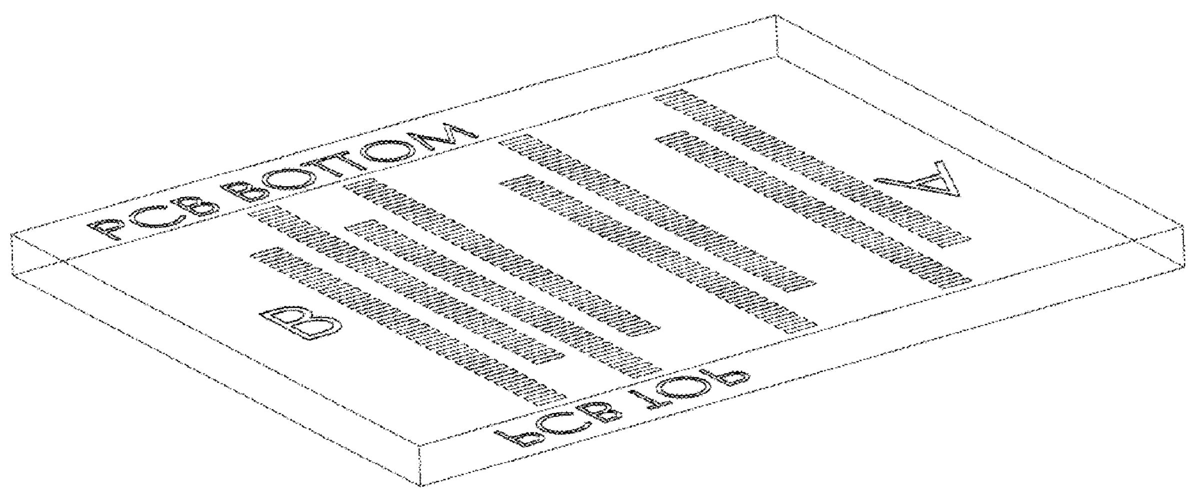
FIG. 7 is a 3D drawing of two OSFP-XD electrical connectors' footprints Footprint A and Footprint B respectively disposed and aligned in a special way on the top side and on the bottom side of a PCB board.
8.

11. As shown in FIG. 7, OSFP-XD electrical connector Connector B's footprint Footprint B is placed on the bottom side of the same PCB board shown in FIG. 6. And the two footprints Footprint A and Footprint B are aligned the way as shown in FIG. 3.

Figure 8:
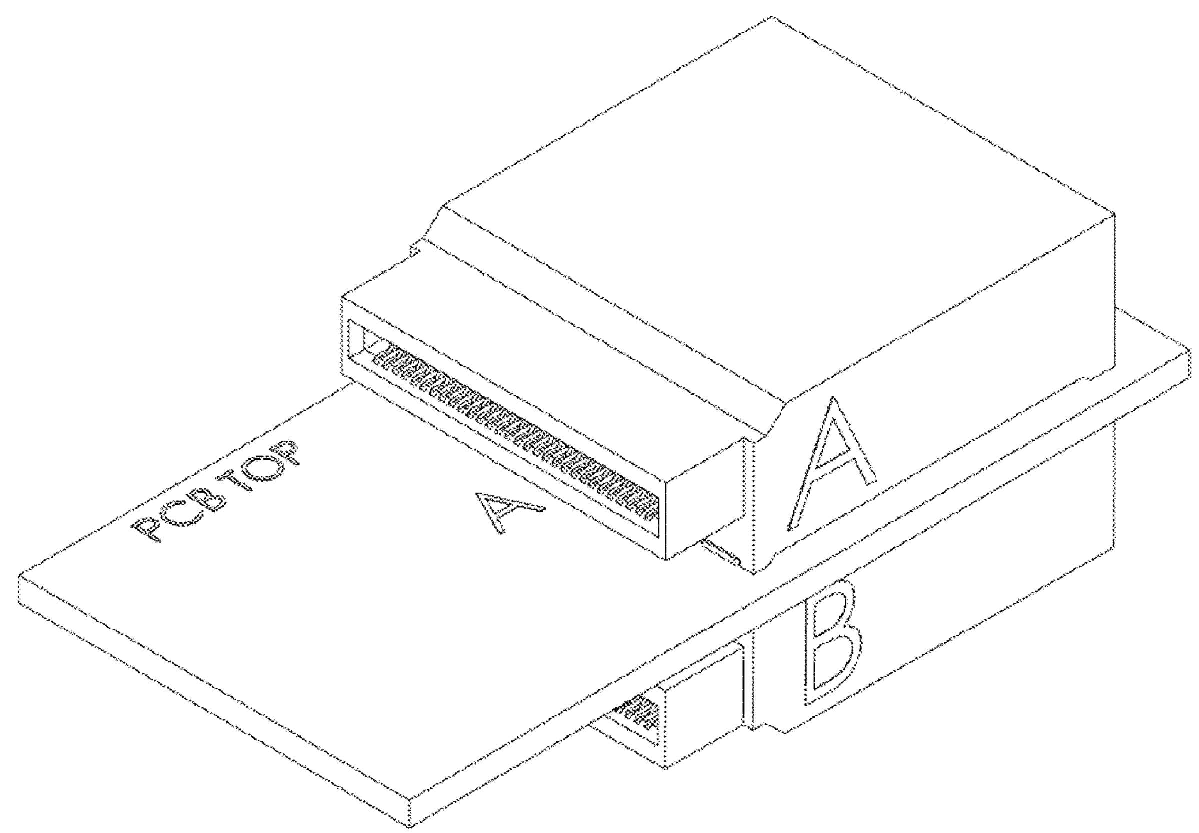
FIG. 8 is a 3D drawing of two OSFP-XD electrical connectors Connector A and Connector B respectively soldered onto their footprints Footprint A and Footprint B, which are located on the top side and the bottom side of a PCB board.
9.

12. As shown in FIG. 8, OSFP-XD electrical connectors Connector A and Connector B are individually soldered onto their footprints Footprint A and Footprint B, which are placed on opposite sides of a PCB board and specially aligned as the way shown in FIG. 3.

Figure 9:
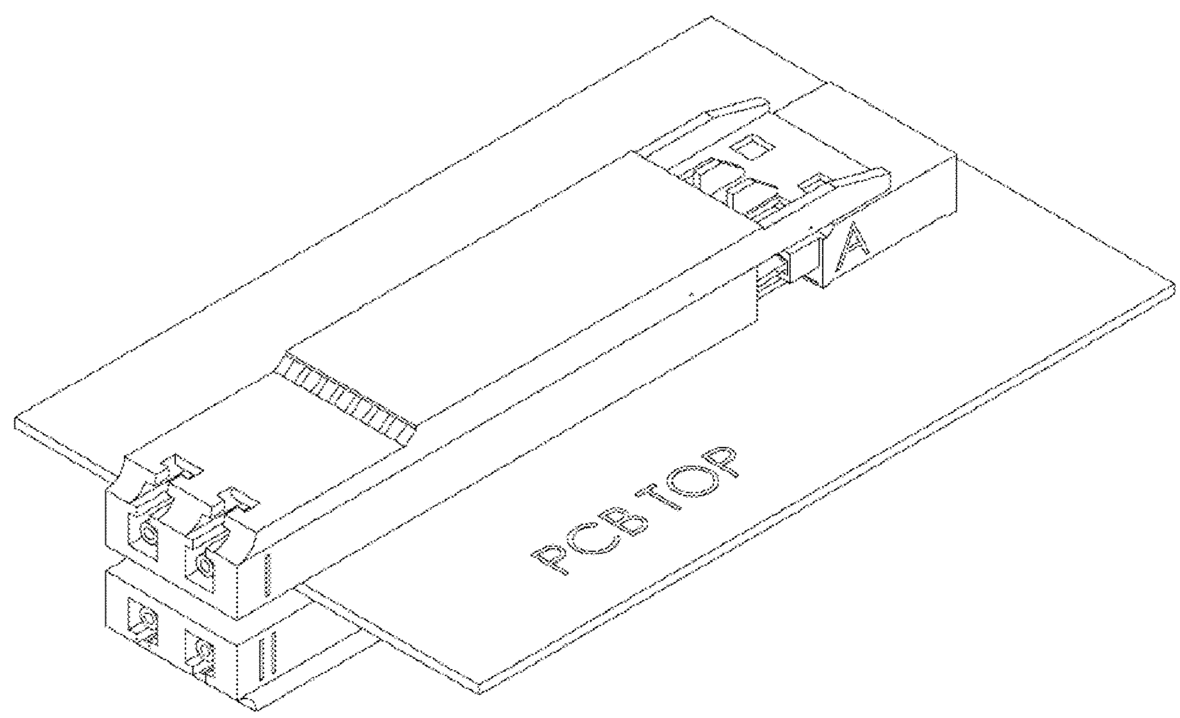
FIG. 9 is a 3D drawing of two OSFP-XD transceivers Transceiver I and Transceiver II respectively plugged into their electrical connectors Connector A and Connector B, which are mounted on the opposite sides of a PCB board.
10.

13. As shown in FIG. 9, OSFP-XD transceivers Transceiver I and Transceiver II are respectively plugged into their electrical connectors Connector A and Connector B, which are individually mounted on Footprint A on the top side of a PCB and Footprint B on the bottom side of the PCB board.

Figure 10:
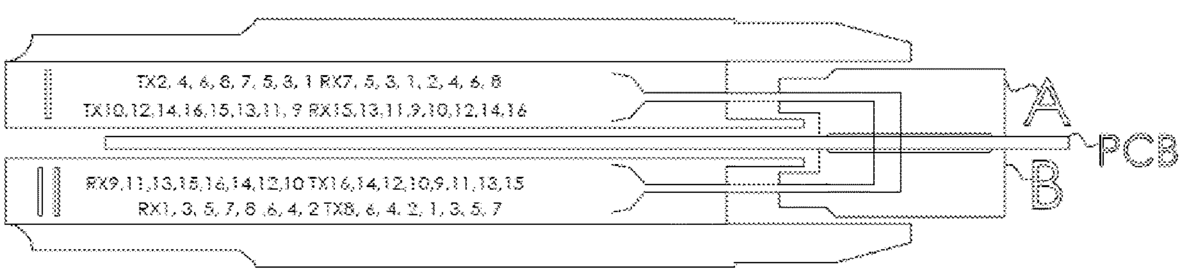
FIG. 10 is a 3D drawing of how high-speed electrical signals coming from two OSFP-XD transceivers Transceiver I and Transceiver II are connected through module edge card connectors, module electrical connectors Connector A and Connector B, connectors' footprints Footprint A and Footprint B, PCB traces and vias.
11. Table 1 is a table showing the pin assignments of high-speed signals and GND signals of the OSFP-XD electrical connector's footprint Footprint A disposed on the top side of a PCB board.
12. Table 2 is a table showing the pin assignments of high-speed signals and GND signals of the OSFP-XD electrical connector's footprint Footprint B disposed on the bottom side of a PCB board.
13. Table 3 is a table showing the Type I connections of the pads coming from the two OSFP-XD electrical connectors' footprints Footprint A and Footprint B respectively disposed on the top side and the bottom side of a PCB board.
14. Table 4 is a table showing the Type II connections of the pads coming from the two OSFP-XD electrical connectors' footprints Footprint A and Footprint B respectively disposed on the top side and the bottom side of a PCB board.

14. As shown in FIG. 10, the high-speed signals (shown in Table 1) from OSFP-XD transceiver Transceiver I and the high-speed signals (shown in Table 2) from OSFP-XD transceiver Transceiver II are directly connected electrically through Transceiver I's edge card connector, Connector A, Footprint A, PCB traces, vias, Footprint B, Connector B and Transceiver II's edge card connector in the shortest way.

The invention claimed is:

1. An interposer comprising:

a first Octal Small Form Factor, Extra Density (OSFP-XD) electrical connector Connector A and its footprint Footprint A disposed on a PCB;

a second OSFP-XD electrical connector Connector B and its footprint Footprint B disposed on the same PCB;

wherein the high-speed signals' pads of Footprint A and the high-speed signals' pads of Footprint B are electrically connected through the PCB;

the pad-to-pad connections are defined as Type I or Type II;

Type I connections comprise

Footprint A's pad 2 connected to Footprint B's pad 29,
Footprint A's pad 3 connected to Footprint B's pad 28,
Footprint A's pad 5 connected to Footprint B's pad 26,
Footprint A's pad 6 connected to Footprint B's pad 25,
Footprint A's pad 8 connected to Footprint B's pad 23,
Footprint A's pad 9 connected to Footprint B's pad 22,
Footprint A's pad 11 connected to Footprint B's pad 20,
Footprint A's pad 12 connected to Footprint B's pad 19,
Footprint A's pad 19 connected to Footprint B's pad 12,
Footprint A's pad 20 connected to Footprint B's pad 11,
Footprint A's pad 22 connected to Footprint B's pad 9,
Footprint A's pad 23 connected to Footprint B's pad 8,
Footprint A's pad 25 connected to Footprint B's pad 6,
Footprint A's pad 26 connected to Footprint B's pad 5,
Footprint A's pad 28 connected to Footprint B's pad 3,
Footprint A's pad 29 connected to Footprint B's pad 2,
Footprint A's pad 32 connected to Footprint B's pad 59,
Footprint A's pad 33 connected to Footprint B's pad 58,
Footprint A's pad 35 connected to Footprint B's pad 56,
Footprint A's pad 36 connected to Footprint B's pad 55,
Footprint A's pad 38 connected to Footprint B's pad 53,
Footprint A's pad 39 connected to Footprint B's pad 52,
Footprint A's pad 41 connected to Footprint B's pad 50,
Footprint A's pad 42 connected to Footprint B's pad 49,
Footprint A's pad 49 connected to Footprint B's pad 42,
Footprint A's pad 50 connected to Footprint B's pad 41,
Footprint A's pad 52 connected to Footprint B's pad 39,
Footprint A's pad 53 connected to Footprint B's pad 38,
Footprint A's pad 55 connected to Footprint B's pad 36,
Footprint A's pad 56 connected to Footprint B's pad 35,
Footprint A's pad 58 connected to Footprint B's pad 33,
Footprint A's pad 59 connected to Footprint B's pad 32,
Footprint A's pad 62 connected to Footprint B's pad 89,
Footprint A's pad 63 connected to Footprint B's pad 88,
Footprint A's pad 65 connected to Footprint B's pad 86,
Footprint A's pad 66 connected to Footprint B's pad 85,
Footprint A's pad 68 connected to Footprint B's pad 83,
Footprint A's pad 69 connected to Footprint B's pad 82,
Footprint A's pad 71 connected to Footprint B's pad 80,
Footprint A's pad 72 connected to Footprint B's pad 79,
Footprint A's pad 79 connected to Footprint B's pad 72,
Footprint A's pad 80 connected to Footprint B's pad 71,
Footprint A's pad 82 connected to Footprint B's pad 69,
Footprint A's pad 83 connected to Footprint B's pad 68,
Footprint A's pad 85 connected to Footprint B's pad 66,
Footprint A's pad 86 connected to Footprint B's pad 65,
Footprint A's pad 88 connected to Footprint B's pad 63,
Footprint A's pad 89 connected to Footprint B's pad 62,
Footprint A's pad 92 connected to Footprint B's pad 119,
Footprint A's pad 93 connected to Footprint B's pad 118,
Footprint A's pad 95 connected to Footprint B's pad 116,
Footprint A's pad 96 connected to Footprint B's pad 115,
Footprint A's pad 98 connected to Footprint B's pad 113,
Footprint A's pad 99 connected to Footprint B's pad 112,
Footprint A's pad 101 connected to Footprint B's pad 110,
Footprint A's pad 102 connected to Footprint B's pad 109,
Footprint A's pad 109 connected to Footprint B's pad 102,
Footprint A's pad 110 connected to Footprint B's pad 101,
Footprint A's pad 112 connected to Footprint B's pad 99,
Footprint A's pad 113 connected to Footprint B's pad 98,
Footprint A's pad 115 connected to Footprint B's pad 96,
Footprint A's pad 116 connected to Footprint B's pad 95,
Footprint A's pad 118 connected to Footprint B's pad 93,
Footprint A's pad 119 connected to Footprint B's pad 92;

Type II connections comprise

Footprint A's pad 2 connected to Footprint B's pad 28,
Footprint A's pad 3 connected to Footprint B's pad 29,
Footprint A's pad 5 connected to Footprint B's pad 25,
Footprint A's pad 6 connected to Footprint B's pad 26,
Footprint A's pad 8 connected to Footprint B's pad 22,
Footprint A's pad 9 connected to Footprint B's pad 23,
Footprint A's pad 11 connected to Footprint B's pad 19,
Footprint A's pad 12 connected to Footprint B's pad 20,
Footprint A's pad 19 connected to Footprint B's pad 11,
Footprint A's pad 20 connected to Footprint B's pad 12,
Footprint A's pad 22 connected to Footprint B's pad 8,
Footprint A's pad 23 connected to Footprint B's pad 9,
Footprint A's pad 25 connected to Footprint B's pad 5,
Footprint A's pad 26 connected to Footprint B's pad 6,
Footprint A's pad 28 connected to Footprint B's pad 2,
Footprint A's pad 29 connected to Footprint B's pad 3,
Footprint A's pad 32 connected to Footprint B's pad 58,
Footprint A's pad 33 connected to Footprint B's pad 59,
Footprint A's pad 35 connected to Footprint B's pad 55,
Footprint A's pad 36 connected to Footprint B's pad 56,
Footprint A's pad 38 connected to Footprint B's pad 52,
Footprint A's pad 39 connected to Footprint B's pad 53,
Footprint A's pad 41 connected to Footprint B's pad 49,
Footprint A's pad 42 connected to Footprint B's pad 50,
Footprint A's pad 49 connected to Footprint B's pad 41,
Footprint A's pad 50 connected to Footprint B's pad 42,
Footprint A's pad 52 connected to Footprint B's pad 38,
Footprint A's pad 53 connected to Footprint B's pad 39,
Footprint A's pad 55 connected to Footprint B's pad 35,
Footprint A's pad 56 connected to Footprint B's pad 36,
Footprint A's pad 58 connected to Footprint B's pad 32,
Footprint A's pad 59 connected to Footprint B's pad 33,
Footprint A's pad 62 connected to Footprint B's pad 88,
Footprint A's pad 63 connected to Footprint B's pad 89,
Footprint A's pad 65 connected to Footprint B's pad 85,
Footprint A's pad 66 connected to Footprint B's pad 86,
Footprint A's pad 68 connected to Footprint B's pad 82,
Footprint A's pad 69 connected to Footprint B's pad 83,
Footprint A's pad 71 connected to Footprint B's pad 79,
Footprint A's pad 72 connected to Footprint B's pad 80,
Footprint A's pad 79 connected to Footprint B's pad 71,
Footprint A's pad 80 connected to Footprint B's pad 72,
Footprint A's pad 82 connected to Footprint B's pad 68,
Footprint A's pad 83 connected to Footprint B's pad 69,
Footprint A's pad 85 connected to Footprint B's pad 65,
Footprint A's pad 86 connected to Footprint B's pad 66,
Footprint A's pad 88 connected to Footprint B's pad 62,
Footprint A's pad 89 connected to Footprint B's pad 63,
Footprint A's pad 92 connected to Footprint B's pad 118,
Footprint A's pad 93 connected to Footprint B's pad 119,
Footprint A's pad 95 connected to Footprint B's pad 115,
Footprint A's pad 96 connected to Footprint B's pad 116,
Footprint A's pad 98 connected to Footprint B's pad 112,
Footprint A's pad 99 connected to Footprint B's pad 113,
Footprint A's pad 101 connected to Footprint B's pad 109,
Footprint A's pad 102 connected to Footprint B's pad 110, Footprint A's pad 109 connected to Footprint B's pad 101,
Footprint A's pad 110 connected to Footprint B's pad 102,
Footprint A's pad 112 connected to Footprint B's pad 98,
Footprint A's pad 113 connected to Footprint B's pad 99,
Footprint A's pad 115 connected to Footprint B's pad 95,
Footprint A's pad 116 connected to Footprint B's pad 96,
Footprint A's pad 118 connected to Footprint B's pad 92,
Footprint A's pad 119 connected to Footprint B's pad 93.

each of the pad to pad connections of Type I or Type II is implemented through length adjustable metal traces plus at least one metal plated via, or through length adjustable metal traces plus at least one capacitor or one resistor;

the length adjustable metal traces for each of the pad-to-pad connections are further specified that the total length of all segments is in range of 0 mm to 500 mm, including 0 mm;

and additionally all the length adjustable metal traces for each of the pad-to-pad connections of Type I or Type II can be uniformly symmetrical, not uniformly symmetrical or all in different forms.

2. The interposer of claim 1, wherein variations or modifications are permitted to the Footprint A of claim 1, to the Footprint B of claim 1, or to both the Footprint A of claim 1 and the Footprint B of claim 1 without departing from the pad-to-pad connection scheme of claim 1, the variations or modifications comprising at least one of: adding pads, removing pads, changing pad sizes, offsetting pad locations or renumbering pads.

3. A platform comprising:

the interposer of claim 1, wherein the OSFP-XD electrical connector Connector A of claim 1 is soldered or epoxied onto the Footprint A of claim 1, and the OSFP-XD electrical connector Connector B of claim 1 is soldered or epoxied onto the Footprint B of claim 1;

a first OSFP-XD transceiver module Transceiver I is plugged into the Connector A of claim 1, and a second OSFP-XD transceiver module Transceiver II is plugged into the Connector B of claim 1.

4. The platform of claim 3 provides a method of direct (not through any ICs), cableless (without using any RF-cables), and uniform-capable electrical high-speed connections for the electrical high-speed signals between the first OSFP-XD transceiver module Transceiver I of claim 3 and the second OSFP-XD transceiver module Transceiver II of claim 3.

5. The platform of claim 3, wherein one of the first OSFP-XD transceiver module Transceiver I of claim 3 or the second OSFP-XD transceiver module Transceiver II of claim 3 is a Form Factor Pluggable module configured to perform at least one of the following functions: a Form Factor Pluggable Signal Quality Analyzer (SQA) a Form Factor Pluggable Data Error Analyzer (DEA) a Form Factor Pluggable Forward Error Correction (FEC) Network Traffic Analyzer, and the other of the first OSFP-XD transceiver module Transceiver I and the second OSFP-XD transceiver module Transceiver II is a transceiver being tested.

6. An interposer comprising:

a first OSFP-XD electrical connector Connector A and its footprint Footprint A disposed on a PCB;

a second OSFP-XD electrical connector Connector B and its footprint Footprint B disposed on the same PCB;

wherein high-speed signal pads of Footprint A and high-speed signal pads of Footprint B are electrically connected through the PCB;

wherein the pad-to-pad connections between the high-speed signal pads of Footprint A and the high-speed signal pads of Footprint B are defined as Type III connections, comprising:

Footprint A's pad 2 connected to Footprint B's pad 32,
Footprint A's pad 3 connected to Footprint B's pad 33,
Footprint A's pad 5 connected to Footprint B's pad 35,
Footprint A's pad 6 connected to Footprint B's pad 36,
Footprint A's pad 8 connected to Footprint B's pad 38,
Footprint A's pad 9 connected to Footprint B's pad 39,
Footprint A's pad 11 connected to Footprint B's pad 41,
Footprint A's pad 12 connected to Footprint B's pad 42,
Footprint A's pad 19 connected to Footprint B's pad 49,
Footprint A's pad 20 connected to Footprint B's pad 50,
Footprint A's pad 22 connected to Footprint B's pad 52,
Footprint A's pad 23 connected to Footprint B's pad 53,
Footprint A's pad 25 connected to Footprint B's pad 55,
Footprint A's pad 26 connected to Footprint B's pad 56,
Footprint A's pad 28 connected to Footprint B's pad 58,
Footprint A's pad 29 connected to Footprint B's pad 59,
Footprint A's pad 32 connected to Footprint B's pad 2,
Footprint A's pad 33 connected to Footprint B's pad 3,
Footprint A's pad 35 connected to Footprint B's pad 5,
Footprint A's pad 36 connected to Footprint B's pad 6,
Footprint A's pad 38 connected to Footprint B's pad 8,
Footprint A's pad 39 connected to Footprint B's pad 9,
Footprint A's pad 41 connected to Footprint B's pad 11,
Footprint A's pad 42 connected to Footprint B's pad 12,
Footprint A's pad 49 connected to Footprint B's pad 19,
Footprint A's pad 50 connected to Footprint B's pad 20,
Footprint A's pad 52 connected to Footprint B's pad 22,
Footprint A's pad 53 connected to Footprint B's pad 23,
Footprint A's pad 55 connected to Footprint B's pad 25,
Footprint A's pad 56 connected to Footprint B's pad 26,
Footprint A's pad 58 connected to Footprint B's pad 28,
Footprint A's pad 59 connected to Footprint B's pad 29,
Footprint A's pad 62 connected to Footprint B's pad 92,
Footprint A's pad 63 connected to Footprint B's pad 93,
Footprint A's pad 65 connected to Footprint B's pad 95,
Footprint A's pad 66 connected to Footprint B's pad 96,
Footprint A's pad 68 connected to Footprint B's pad 98,
Footprint A's pad 69 connected to Footprint B's pad 99,
Footprint A's pad 71 connected to Footprint B's pad 101,
Footprint A's pad 72 connected to Footprint B's pad 102,
Footprint A's pad 79 connected to Footprint B's pad 109,
Footprint A's pad 80 connected to Footprint B's pad 110,
Footprint A's pad 82 connected to Footprint B's pad 112,
Footprint A's pad 83 connected to Footprint B's pad 113,
Footprint A's pad 85 connected to Footprint B's pad 115,
Footprint A's pad 86 connected to Footprint B's pad 116,
Footprint A's pad 88 connected to Footprint B's pad 118,
Footprint A's pad 89 connected to Footprint B's pad 119,
Footprint A's pad 92 connected to Footprint B's pad 62,
Footprint A's pad 93 connected to Footprint B's pad 63,
Footprint A's pad 95 connected to Footprint B's pad 65,
Footprint A's pad 96 connected to Footprint B's pad 66,
Footprint A's pad 98 connected to Footprint B's pad 68,
Footprint A's pad 99 connected to Footprint B's pad 69,
Footprint A's pad 101 connected to Footprint B's pad 71,
Footprint A's pad 102 connected to Footprint B's pad 72,
Footprint A's pad 109 connected to Footprint B's pad 79,
Footprint A's pad 110 connected to Footprint B's pad 80,
Footprint A's pad 112 connected to Footprint B's pad 82,
Footprint A's pad 113 connected to Footprint B's pad 83,
Footprint A's pad 115 connected to Footprint B's pad 85,
Footprint A's pad 116 connected to Footprint B's pad 86,
Footprint A's pad 118 connected to Footprint B's pad 88, Footprint A's pad 119 connected to Footprint B's pad 89.

7. An interposer comprising:

a first OSFP-XD electrical connector Connector A and its footprint Footprint A disposed on a PCB;

a second OSFP-XD electrical connector Connector B and its footprint Footprint B disposed on the same PCB;

wherein high-speed signal pads of Footprint A and high-speed signal pads of Footprint B are electrically connected through the PCB;

wherein the pad-to-pad connections between the high-speed signal pads of Footprint A and the high-speed signal pads of Footprint B are defined as Type IV connections, comprising:

Footprint A's pad 2 connected to Footprint B's pad 33,
Footprint A's pad 3 connected to Footprint B's pad 32,
Footprint A's pad 5 connected to Footprint B's pad 36,
Footprint A's pad 6 connected to Footprint B's pad 35,
Footprint A's pad 8 connected to Footprint B's pad 39,
Footprint A's pad 9 connected to Footprint B's pad 38,
Footprint A's pad 11 connected to Footprint B's pad 42,
Footprint A's pad 12 connected to Footprint B's pad 41,
Footprint A's pad 19 connected to Footprint B's pad 50,
Footprint A's pad 20 connected to Footprint B's pad 49,
Footprint A's pad 22 connected to Footprint B's pad 53,
Footprint A's pad 23 connected to Footprint B's pad 52,
Footprint A's pad 25 connected to Footprint B's pad 56,
Footprint A's pad 26 connected to Footprint B's pad 55,
Footprint A's pad 28 connected to Footprint B's pad 59,
Footprint A's pad 29 connected to Footprint B's pad 58,
Footprint A's pad 32 connected to Footprint B's pad 3,
Footprint A's pad 33 connected to Footprint B's pad 2,
Footprint A's pad 35 connected to Footprint B's pad 6,
Footprint A's pad 36 connected to Footprint B's pad 5,
Footprint A's pad 38 connected to Footprint B's pad 9,
Footprint A's pad 39 connected to Footprint B's pad 8,
Footprint A's pad 41 connected to Footprint B's pad 12,
Footprint A's pad 42 connected to Footprint B's pad 11,
Footprint A's pad 49 connected to Footprint B's pad 20,
Footprint A's pad 50 connected to Footprint B's pad 19,
Footprint A's pad 52 connected to Footprint B's pad 23,
Footprint A's pad 53 connected to Footprint B's pad 22,
Footprint A's pad 55 connected to Footprint B's pad 26,
Footprint A's pad 56 connected to Footprint B's pad 25,
Footprint A's pad 58 connected to Footprint B's pad 29,
Footprint A's pad 59 connected to Footprint B's pad 28,
Footprint A's pad 62 connected to Footprint B's pad 93,
Footprint A's pad 63 connected to Footprint B's pad 92,
Footprint A's pad 65 connected to Footprint B's pad 96,
Footprint A's pad 66 connected to Footprint B's pad 95,
Footprint A's pad 68 connected to Footprint B's pad 99,
Footprint A's pad 69 connected to Footprint B's pad 98,
Footprint A's pad 71 connected to Footprint B's pad 102,
Footprint A's pad 72 connected to Footprint B's pad 101,
Footprint A's pad 79 connected to Footprint B's pad 110,
Footprint A's pad 80 connected to Footprint B's pad 109,
Footprint A's pad 82 connected to Footprint B's pad 113,
Footprint A's pad 83 connected to Footprint B's pad 112,
Footprint A's pad 85 connected to Footprint B's pad 116,
Footprint A's pad 86 connected to Footprint B's pad 115,
Footprint A's pad 88 connected to Footprint B's pad 119,
Footprint A's pad 89 connected to Footprint B's pad 118,
Footprint A's pad 92 connected to Footprint B's pad 63,
Footprint A's pad 93 connected to Footprint B's pad 62,
Footprint A's pad 95 connected to Footprint B's pad 66,
Footprint A's pad 96 connected to Footprint B's pad 65,
Footprint A's pad 98 connected to Footprint B's pad 69,
Footprint A's pad 99 connected to Footprint B's pad 68,
Footprint A's pad 101 connected to Footprint B's pad 72,
Footprint A's pad 102 connected to Footprint B's pad 71,
Footprint A's pad 109 connected to Footprint B's pad 80,
Footprint A's pad 110 connected to Footprint B's pad 79,
Footprint A's pad 112 connected to Footprint B's pad 83,
Footprint A's pad 113 connected to Footprint B's pad 82,
Footprint A's pad 115 connected to Footprint B's pad 86,
Footprint A's pad 116 connected to Footprint B's pad 85,
Footprint A's pad 118 connected to Footprint B's pad 89,
Footprint A's pad 119 connected to Footprint B's pad 88.

* * * * *